United States Patent Office 3,448,997
Patented June 10, 1969

3,448,997
BICYCLE SKELETON FRAME
Jiro Kosugi, 36-23, 1-chome, Wada, Suginami-ku,
Tokyo-to, Japan
Filed June 13, 1967, Ser. No. 645,804
Int. Cl. B62k 3/00, 7/00, 19/00
U.S. Cl. 280—281                                    2 Claims

ABSTRACT OF THE DISCLOSURE

A cross-shaped structure consisting essentially of a forked longitudinal strut and a rigid seat tube pivotally connected to each other and braced by wire ties connecting their ends constitutes the skeleton frame of a bicycle, the longitudinal strut being fixed at its front end to a head tube for rotatably receiving the bicycle front fork stem and at its rear end to the rear wheel axle, and the seat tube supporting, respectively at its upper and lower ends, a saddle and a bracket cross tube for rotatably receiving the bracket axle. Each wire tie is provided with a turnbuckle and at least one readily disconnectable end, whereby the skeleton frame can be readily folded into a compact form.

---

Figure 1:
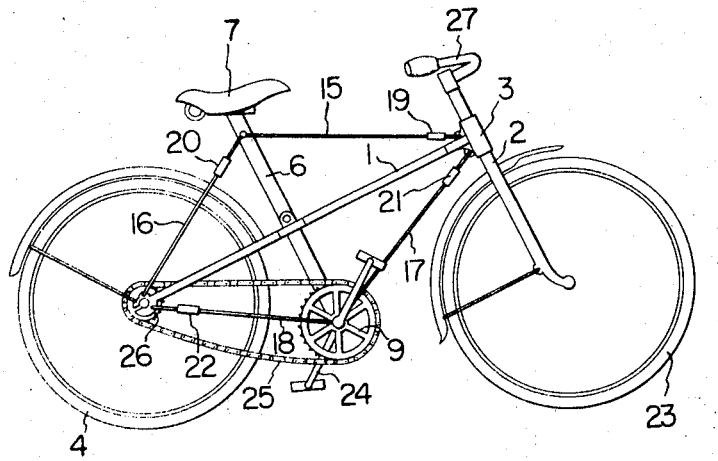

This invention relates to vehicle structures and more particularly to a bicycle skeleton frame which is of light weight and is strong against torsion. Additionally, this structure can be readily folded for stowage or transportation, if necessary.

Heretofore, most bicycle frames have had a construction wherein tubes are assembled and joined in the form essentially of a diamond which is divided into triangles by a seat tube connected between the diagonally opposite obtuse angles of the diamond thereby to form a rigid skeleton frame.

Since numerous structural members of heavy weight are used in the conventional bicycle frame, the total weight thereof is relatively large. Furthermore, since the structural members are joined in a substantially planar arrangement, there have been problems in strength with respect to torsional stresses about axes in the horizontal direction. Also, in cases such as that when the bicycle is to be disassembled, the skeleton frame retains its bulky shape, which is inconvenient for compact stowage or for transportation.

It is an object of the present invention to provided a bicycle skeleton frame of light weight and ample strength which may also be readily folded into a compact form or disassembled.

According to the present invention, briefly summarized, there is provided a bicycle skeleton frame comprising, essentially, a longitudinal member, a seat tube pivotally connected to the longitudinal member to form together therewith a cross-shaped structure, and tension members connected as ties across adjacent extremities of the cross-shaped structure thereby to form a rigid frame structure, which is assembled as a part of a bicycle by steerably connecting the front fork stem to the front end of the longitudinal member, connecting the rear wheel axle to the rear end of the longitudinal member, mounting the saddle seat on the upper end of the seat tube, and rotatably supporting the bracket axle, to which the chain sprocket and pedal cranks are fixed, on the lower end of the seat tube.

The nature, details, and utility of the invention will be more clearly apparent from the following detailed description with respect to a preferred embodiment of the invention when read in conjunction with the accompanying drawing, in which like parts are designated by like reference numerals.

Figure 2:
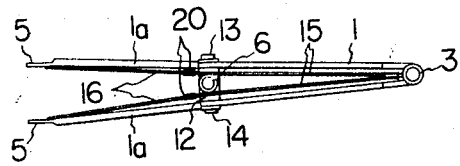
Figure 3:
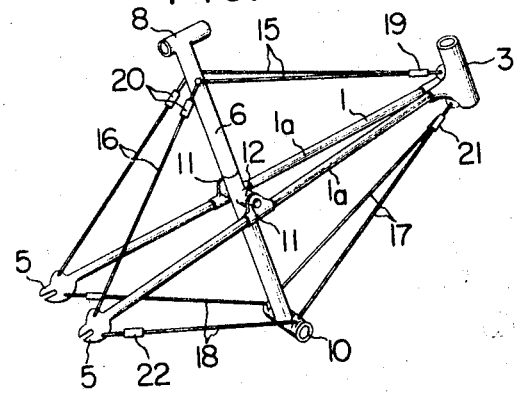

In the drawing:
FIG. 1 is a right-hand side elevational view showing a bicycle provided with an example of a frame constituting a preferred embodiment of the invention;
FIG. 2 is a plan view of the skeleton frame of the bicycle shown in FIG. 1; and
FIG. 3 is a perspective view showing the skeleton frame shown in FIG. 2 as viewed from a point on the right-hand side, slightly above, and slightly to the rear thereof.

Referring to the drawing, the bicycle frame illustrated therein has a longitudinal member 1 consisting of two longeron tubes 1a, 1a joined closely together at their front ends to a head tube 3 provided therewithin with bearings for insertion therein of the fork stem 2 of the front wheel 23. The longeron tubes 1a, 1a mutually diverge in the rearward downward direction from the head tube 3 to their rear solid ends, which are provided with solid end flanges 5, 5 for mounting of the axle of the rear wheel 4. Thus, the longeron tubes 1a, 1a constitute equal sides of a long, narrow isosceles triangle with a base formed by the rear axle and a vertex rigidly fixed to the head tube 3.

The longeron tubes 1a, 1a are provided at a point intermediate between their front and rear ends with rigidly fixed brackets 11, 11, to which a cross tube 12 integrally connected to an intermediate point of a seat tube 6 is pivotally connected by a bolt 13 passed through the brackets 11, 11 and cross tube 12 and locked by a nut 14. Thus, the longitudinal member 1 and the seat tube 6 are, in effect, pin jointed. By extracting the bolt 13, these members can be readily separated for disassembly. Instead of two longeron tubes 1a, 1a joined together at their front ends, this longitudinal member 1 may also be constructed by diecasting in a form such that the portion from the head tube 3 to the intermediate point is made a single integral member which then diverges from this intermediate point to its rear end in a fork shape.

The seat tube 6 has at its upper end a seat mount 8 for supporting a saddle seat 7 and is provided at its lower end with a bracket tube 10 for rotatably supporting a bracket axle to which a chain driving sprocket 9 and pedal cranks 24 are fixed. The sprocket 9 drives a rear sprocket ring 26 through a chain 25 in the conventional manner.

It assembled state, the longitudinal member 1 and the seat tube 6 constitute struts maintained in an X-shaped configuration by stays or tension members in the following manner. Two tension members 15, 15 are stretched across and connected to the front end of the longitudinal member 1, that is, a point on a bracket fixed to the head tube 3, and the upper end of the seat tube 6, the tension members being connected to the seat tube 6 respectively on the left-hand and right-hand sides thereof. Two tension members 16, 16 are stretched across and connected to respectively the upper end of the seat tube 6 on the left-hand and right-hand sides thereof and the rear ends of the longeron tubes 1a, 1a. Two tension members 17, 17 are stretched across and connected to another bracket fixed to the head tube 3 and the lower end of the seat tube 6 on the left-hand and right-hand sides thereof. Two tension members 18, 18 are stretched across and connected to the lower end of the seat tube 6 on the two sides thereof and the rear ends of the longeron tubes 1a, 1a.

The tension members 15, 16, 17, and 18 are made of a metal wire of high tensile strength such as so-called steel piano wire and are provided with turnbuckles 19, 20, 21, and 22, by which the tensions in the tension members can be appropriately adjusted. Each tension member is disconnectably connected at one end or at both ends thereof.

The bicycle skeleton frame of the above-described organization according to the present invention can be readily folded into a narrow form by loosening and disconnecting all tension members and then rotating and folding the seat tube and the longitudinal member around their mutually connecting pivot joint. Furthermore, by disconnecting this pivot joint, the seat tube and longitudinal member can be separated for stowage. In either case, the entire structure can be reduced to a form of very small bulk which is convenient for stowage and transportation.

Another advantageous feature of the frame according to the invention is that, since the seat tube and the longitudinal member are the only rigid elements in the frame and constitute its principal elements, the entire frame is substantially lighter than a conventional bicycle frame. Yet, the frame as a truss has ample strength with respect to leads in the vertical plane.

Moreover, because of the forked or V-shaped form of the longitudinal member, the frame has ample strength and rigidity with respect to torsional loads. In instances of actual practice, it has been found that the bicycle skeleton frame of the present invention has ample strength to withstand planar, bending, and torsional loads,

What I claim is:

1. In a bicycle of the type having a front fork stem, a saddle seat, a bracket axle for supporting a chain driving sprocket and pedal cranks fixed thereto, and a rear wheel axle, a skeleton frame comprising: a longitudinal member having a front end for steerable connection thereto of the front fork stem and a rear end for connection thereto of the rear wheel axle; a seat tube having an upper end for supporting the saddle seat and a lower end for rotatably supporting the bracket axle, said seat tube being pivotally connected at a point thereof intermediate between said upper and lower ends to the longitudinal member at a point thereof intermediate between said front and rear ends to form a cross-shaped structure; tension members respectively connected between adjacent ends of the seat tube and longitudinal member in the cross-shaped structure to function as ties and thereby form a rigid frame structure, each of said tension members being of adjustable length and being disconnectable at at least one end thereof from the cross-shaped structure, said longitudinal member including two longeron tubes fixed at the front end to a head tube for said steerable connection of the front fork stem and extending divergently toward respective ends of the rear wheel axle, said longeron tubes having, at their respective rear ends, solid end flanges for connection of said axle thereto and having respective brackets fixed thereto for pin connection thereto of the tube seat.

2. The skeleton frame as claimed in claim 1 in which the tension members are essentially of metal wire of high tensile strength and are provided with respective turnbuckles.

References Cited

FOREIGN PATENTS

| 4,656 | 2/1920 | Netherlands. |
| 473,721 | 10/1937 | Great Britain. |
| 402,773 | 3/1943 | Italy. |

KENNETH H. BETTS, *Primary Examiner.*

U.S. Cl. X.R.

280—287